(12) United States Patent
Duerr et al.

(10) Patent No.: US 10,625,572 B2
(45) Date of Patent: Apr. 21, 2020

(54) HEATING/COOLING MODULE

(71) Applicant: MAHLE International GmbH, Stuttgart (DE)

(72) Inventors: Gottfried Duerr, Ludwigsburg (DE); Herbert Hofmann, Stuttgart (DE); Joachim Michael Haug, Mundelsheim (DE)

(73) Assignee: MAHLE International GmbH, Stuttgart (DE)

( * ) Notice: Subject to any disclaimer, the term of this patent is extended or adjusted under 35 U.S.C. 154(b) by 286 days.

(21) Appl. No.: 15/262,244

(22) Filed: Sep. 12, 2016

(65) Prior Publication Data

US 2016/0375745 A1 Dec. 29, 2016

Related U.S. Application Data

(63) Continuation of application No. PCT/EP2015/055152, filed on Mar. 12, 2015.

(30) Foreign Application Priority Data

Mar. 17, 2014 (DE) .......................... 10 2014 204 936

(51) Int. Cl.
 *B60H 1/32* (2006.01)
 *F25B 39/00* (2006.01)
 (Continued)

(52) U.S. Cl.
 CPC ....... *B60H 1/3227* (2013.01); *B60H 1/00278* (2013.01); *B60H 1/00485* (2013.01);
 (Continued)

(58) Field of Classification Search
 CPC .............. B60H 1/3227; B60H 1/00278; B60H 1/00485; B60H 1/00899; B60H 1/3229;
 (Continued)

(56) References Cited

U.S. PATENT DOCUMENTS 6,142,221 A * 11/2000 Johansson ............... F28D 9/005
 165/140
7,469,554 B2 12/2008 Martins et al.
 (Continued)

FOREIGN PATENT DOCUMENTS

CN 103328914 A 9/2013
CN 103370594 A 10/2013
 (Continued)

OTHER PUBLICATIONS

Chinese Office Action for Chinese Application No. 201580014140.7 dated Mar. 15, 2018 with English translation.

*Primary Examiner* — Joseph F Trpisovsky
(74) *Attorney, Agent, or Firm* — Muncy, Geissler, Olds & Lowe, P.C.

(57) ABSTRACT

A heating/cooling module having a condenser region, an evaporator region, and at least one fluid distribution region. The condenser region has a first flow section which can be flowed through by a refrigerant and a second flow section which can be flowed through by a coolant. The evaporator region has a third flow section which can be flowed through by a refrigerant and a fourth flow section which can be flowed through by a coolant. The flow sections are formed by a plurality of flow ducts which are configured between the individual disc elements which form the heating/cooling module. A first fluid inlet and a first fluid outlet are provided, via which the condenser region can be flowed through with a coolant. A second inlet and a second outlet are provided, via which the evaporator region can be flowed through with a coolant.

9 Claims, 9 Drawing Sheets

(51) Int. Cl.
  *F25B 40/02*   (2006.01)
  *F25B 25/00*   (2006.01)
  *B60H 1/00*    (2006.01)
  *F28D 9/00*    (2006.01)
  *F28F 9/26*    (2006.01)
  *F25B 43/00*   (2006.01)
  *F28F 3/08*    (2006.01)
  *F28D 21/00*   (2006.01)

(52) U.S. Cl.
  CPC ....... *B60H 1/00899* (2013.01); *B60H 1/3229* (2013.01); *B60H 1/32284* (2019.05); *F25B 25/005* (2013.01); *F25B 39/00* (2013.01); *F25B 40/02* (2013.01); *F25B 43/003* (2013.01); *F28D 9/0093* (2013.01); *F28F 3/08* (2013.01); *F28F 9/26* (2013.01); *B60H 2001/00928* (2013.01); *F25B 2339/047* (2013.01); *F25B 2400/05* (2013.01); *F25B 2500/17* (2013.01); *F25B 2500/18* (2013.01); *F28D 2021/0068* (2013.01); *F28D 2021/0084* (2013.01); *F28D 2021/0085* (2013.01)

(58) Field of Classification Search
  CPC ......... B60H 2001/00928; F25B 25/005; F25B 39/00; F25B 40/02; F25B 43/003; F25B 2339/047; F25B 2400/05; F25B 2500/17; F25B 2500/18; F28D 9/0093; F28D 2021/0068; F28D 2021/0084; F28D 2021/0085; F28F 3/08; F28F 9/26

USPC .......................................................... 62/467
  See application file for complete search history.

(56) References Cited

U.S. PATENT DOCUMENTS

| | | | |
|---|---|---|---|
| 7,753,105 | B2 | 7/2010 | Acre |
| 8,899,062 | B2 | 12/2014 | Kadle et al. |
| 9,093,729 | B2 | 7/2015 | Wesner et al. |
| 2012/0060550 | A1 | 3/2012 | Mann |
| 2012/0111034 | A1* | 5/2012 | Campbell ............ F25B 25/005 62/113 |
| 2012/0210746 | A1 | 8/2012 | Kadle et al. |
| 2012/0216562 | A1 | 8/2012 | Kadle et al. |
| 2012/0222846 | A1 | 9/2012 | Kadle et al. |
| 2013/0000341 | A1 | 1/2013 | De Piero et al. |

FOREIGN PATENT DOCUMENTS

| | | |
|---|---|---|
| CN | 103380335 A | 10/2013 |
| CN | 103591721 A | 2/2014 |
| DE | 10 2010 048 015 A1 | 4/2012 |
| EP | 1 990 221 A1 | 11/2008 |
| EP | 1 992 891 A1 | 11/2008 |
| EP | 2 174 810 B1 | 11/2012 |
| WO | WO 2012/095531 A1 | 7/2012 |
| WO | WO 2012/112802 A2 | 8/2012 |

\* cited by examiner

HEATING/COOLING MODULE

This nonprovisional application is a continuation of International Application No. PCT/EP2015/055152, which was filed on Mar. 12, 2015, and which claims priority to German Patent Application No. 10 2014 204 936.9, which was filed in Germany on Mar. 17, 2014, and which are both herein incorporated by reference.

BACKGROUND OF THE INVENTION

Field of the Invention

The invention relates to a heating/cooling module with a stacked disc design, with a condenser region, with an evaporator region, and with at least one fluid distribution region, whereby the condenser region has a first flow section, through which a refrigerant can flow, and has a second flow section, through which a coolant can flow, and the evaporator region has a third flow section, through which a refrigerant can flow, and has a fourth flow section, through which a coolant can flow, whereby the flow sections are formed by a plurality of flow channels, which are made between the individual disc elements, forming the heating/cooling module, whereby a first fluid inlet and a first fluid outlet are provided, via which a coolant can flow through the evaporator region, and second inlet and a second outlet are provided, via which a coolant can flow through the condenser region, and a third inlet and a third outlet are provided, via which a refrigerant can flow through the heating/cooling module.

Description of the Background Art

Evaporators are routinely used in motor vehicles to cool the interior space. Furthermore, condensers are used which release the heat to the external air. Other components are routinely added to the refrigerant circuits in order to realize further functionalities. This occurs, for example, to enable heating of the interior space or to cool additionally installed batteries. This is increasingly the case particularly in electrically operated vehicles in order to operate the batteries, necessary for driving, within an optimal temperature window.

Because of these additional components, the refrigerant circuits become very complex and error-prone. There is the risk, furthermore, of an unintentional refrigerant migration in idle regions of the refrigerant circuit. Idle regions are, for example, regions with no throughflow at times. Switching valves are needed for the control and regulation of these circuits; these valves entail an increased installation effort and furthermore likewise increase the susceptibility to errors.

In an alternative design, the refrigerant circuit can be connected to a warm and a cold water-Glysantin circuit. In this case, the heat can be coupled out arbitrarily via air-water heat exchangers. At least one so-called chiller and a condenser are needed for providing the warmer and cooler water. A chiller is used in this case particularly for cooling a medium flowing around the chiller. In the simplest case, a circuit produced in this way therefore can comprise a chiller, a condenser, a thermostatic expansion valve (TXV), and a compressor. In addition, a collector can be provided for equalizing fluid fluctuations. A water-side subcooler or an internal heat exchanger can also be provided to bring about improvement in the efficiency.

It is disadvantageous in solutions known in the prior art that the plurality of employed elements bring about a high space requirement. Furthermore, a plurality of connecting lines must be provided in order to connect the individual elements to one another. These connections increase the assembly effort and represent an additional source of error. It is disadvantageous, furthermore, that no internal heat exchangers or chillers are integrated in solutions known thus far, which are formed by a combination of a plurality of heat exchanger elements in one structural unit.

SUMMARY OF THE INVENTION

It is therefore the object of the present invention to provide a heating/cooling module which is notable for a compact design and has as few connections as possible for supplying the individual components in the heating/cooling module. Furthermore, the heating/cooling module is to be especially simple to manufacture.

An embodiment of the invention relates to a heating/cooling module with a stacked disc design, with a condenser region, with an evaporator region, and with at least one fluid distribution region, whereby the condenser region has a first flow section, through which a refrigerant can flow, and has a second flow section, through which a coolant can flow, and the evaporator region has a third flow section, through which a refrigerant can flow, and has a fourth flow section, through which a coolant can flow, whereby the flow sections are formed by a plurality of flow channels, which are made between the individual disc elements, forming the heating/cooling module, whereby a first fluid inlet and a first fluid outlet are provided, via which a coolant can flow through the condenser region, and second inlet and a second outlet are provided, via which a coolant can flow through the evaporator region, and a third inlet and a third outlet are provided, via which a refrigerant can flow through the heating/cooling module, whereby the at least one fluid distribution region is disposed between the condenser region and the evaporator region and has a thermostatic expansion valve through which refrigerant can flow.

A fluid distribution region is particularly advantageous in order to realize the fluid supply and fluid removal into the heating/cooling module and out of the heating/cooling module. The fluid distribution region in this case can also be part of, for example, the refrigerant and/or coolant flow sections. Sleeves or tube sections as well, which enable a fluid line through the specific region, can be run through the fluid distribution region but also through the evaporator region and/or the condenser region. In an advantageous embodiment, a plurality of fluid distribution regions can also be provided.

It is an embodiment, a separate coolant stream can flow through the condenser region and the evaporator region. Two water circuits with different temperature levels, in particular a warm water circuit and a cold water circuit, can be supplied in this manner by the heating/cooling module, which forms a structural unit.

A second fluid distribution region can be provided, which is disposed on the side, facing away from the first fluid distribution region, of the evaporator region or the condenser region.

A second fluid distribution region is especially advantageous to enable greater flexibility with respect to the arrangement of the fluid inlets and fluid outlets. In alternative embodiments further fluid distribution regions can also be provided. In particular the flow through the heating/cooling module can also be influenced by the position of the fluid inlets and fluid outlets.

An exemplary embodiment provides that individual flow channels between the disc elements can be in fluid communication with one another due to openings with passages or openings without passages in the disc elements.

A fluid flow upward and/or downward to the flow channels adjacent in each case can be achieved by means of the openings in the disc elements. It can be achieved by means of the openings with passages that individual flow channels can be skipped.

The flow channels, formed between the disc elements, can be divided into a number of regions by partition elements, each of the individual regions being assigned to a heat exchanger.

By dividing the individual flow channels into subregions, the individual regions, forming the individual heat exchangers, can be separated fluidically from one another. Partition walls, for example, can be provided for this purpose. The individual regions can be divided both in the direction of the stack direction and in a direction transverse to the disc stack direction.

The individual regions can be in fluid communication with one another via flange elements. Flange elements can be provided, which enable conveyance of fluids between the individual regions. As a result, a fluid can be conveyed through a number of regions within the heating/cooling module.

The inlets and/or outlets can be integrated into the flange elements. This is especially advantageous to achieve a compact heating/cooling module design. At the same time, a skillful construction of the flange elements can achieve that the fluid when flowing in via a fluid inlet is divided equally among a number of regions or upon flowing out via a fluid outlet is conveyed away simultaneously from a number of regions.

The inlets and/or outlets can each be integrated on one or more disc elements or between two adjacent disc elements and are in fluid communication with at least one flow channel, whereby the particular disc elements are arranged adjacent to the disc elements that close the disc stack at the top and bottom. It is especially advantageous, if the fluid inlets and fluid outlets open directly into the particular flow channels, formed between two disc elements adjacent to one another. A direct supplying or discharging into or out of the flow channels occurs in this way. This also contributes to a compact heating/cooling module design.

In an embodiment, all inlets and outlets can be disposed on a common outer surface of the heating/cooling module. An arrangement of all inlets and outlets on a common outer surface of the heating/cooling module is especially advantageous to achieve a compact heating/cooling module design. This results in an advantageous design for mounting the heating/cooling module in an available installation space, because supply and discharge lines need to be provided on only one side. This reduces the necessary installation space and is moreover advantageous for maintenance and repair work.

The heating/cooling module can have a collector and/or an internal heat exchanger and/or a subcooler, in addition to the condenser region, the evaporator region, and the fluid distribution region.

A collector is advantageous to create a fluid reservoir, which is required to be able to equalize volume fluctuations in particular within the refrigerant circuit. A further heat transfer within the heating/cooling module can be created advantageously by an internal heat exchanger. This occurs preferably between a refrigerant, which has flowed out of the evaporator region, and a refrigerant, which has flowed out of the condenser region. The efficiency of the heating/cooling module can be increased further by this additional heat transfer. A subcooler is furthermore advantageous to achieve a further heat transfer between the refrigerant and a coolant. This increases the efficiency of the heating/cooling module further.

A filter can be integrated into one of the refrigerant flow sections, whereby the filter is mounted in the flow direction upstream of the thermostatic expansion valve. A filter is particularly advantageous, if it is mounted in the flow direction upstream of the expansion valve in order to filter particles that could damage the expansion valve. The filter can be inserted advantageously in the heating/cooling module and connected releasably to it. Easy maintenance of the filter can be made possible thereby.

A collector can be disposed outside the heating/cooling module on or adjacent to one of its outer surfaces, whereby the collector is in fluid communication with one of the refrigerant flow sections. The collector can be disposed advantageously outside the disc stack as well. Preferably it is then placed on one of the outer surfaces of the heating/cooling module. This is particularly advantageous, if a collector volume is needed that can no longer be integrated into the heating/cooling module without substantial structural modifications.

A pressure-reducing section in the form of a cross-sectional narrowing can be provided along one of the refrigerant flow sections or one of the coolant flow sections. A pressure-reducing section is particularly advantageous, if a low-pressure region is to be created. This occurs advantageously in the flow direction upstream of the evaporator. This also makes it possible to use a low-pressure collector. The cross-sectional narrowing can be produced, for example, by an orifice or a tube.

In an embodiment, the coolant and the refrigerant can flow in a cocurrent or countercurrent to one another through the individual heat exchangers, formed by the regions. The heat transfer between the media can be influenced by the flow in a cocurrent and countercurrent. Depending on the fluid routing within the heating/cooling module, both sections through which a countercurrent flows and sections through which a cocurrent flows can be created.

In an embodiment, the evaporator region, the condenser region, and the first fluid distribution region, and, if present, a further fluid distribution region, and/or the subcooler, and/or the collector, and/or the internal heat exchanger are arranged next to one another in a direction transverse to the stack direction of the heating/cooling module. This is especially advantageous in order to realize a simple heating/cooling module structure.

It is advantageous according to the invention, if all parts, other than a possibly present TXV expansion valve and a possibly present filter, can be produced by mass soldering. This can mean that the aforementioned parts are completely soldered in a single soldering process. If a so-called orifice expansion valve is used, it can even be soldered concurrently.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
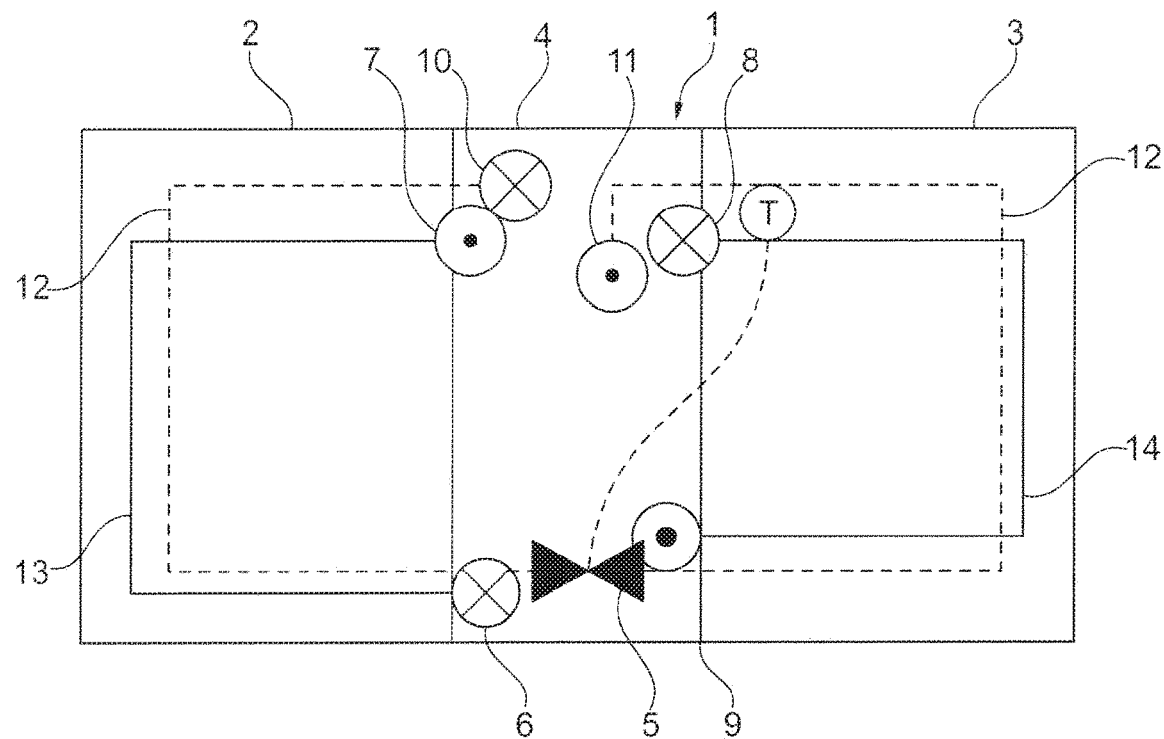
FIG. 1 shows a schematic view of a heating/cooling module, whereby the heating/cooling module is constructed with a stacked disc design and the heating/cooling module further is divided into a number of regions, which form different heat exchangers, and FIGS. 2 to 18 each show an embodiment of a heating/cooling module, whereby the individual regions are installed in series in different sequences and the flow through the individual regions is varied by the location of the fluid inlets and fluid outlets.

FIG. 1 and the additional FIGS. 2 to 18 each show a schematic view of heating/cooling module 1. All shown heating/cooling modules 1 each have a first fluid inlet 6 and a first fluid outlet 7 through which a coolant can flow into and flow out of heating/cooling module 1. In this regard, the flow passes through condenser region 2 in particular of heating/cooling module 1. Further, all heating/cooling modules 1 have a second fluid inlet 8 and a second fluid outlet 9, through which a coolant can also flow in and flow out, whereby this coolant flows primarily through evaporator region 3 of heating/cooling module 1. Further, all heating/cooling modules 1 have a third fluid inlet 10 and a third fluid outlet 11, through which a refrigerant can flow into or out of heating/cooling module 1. The refrigerant in this case preferably flows through all regions 2, 3 of heating/cooling module 1.

Flow section 13 designates the flow path of the coolant in condenser region 2. Flow section 14 designates the flow of the coolant within evaporator region 3. Further, flow section 12 designates the flow path of the refrigerant between third fluid inlet 10 and third fluid outlet 11. Flow section 12 in this case runs routinely both through evaporator region 3, condenser region 2, and also fluid distribution region 4.

All FIGS. 1 to 18 each have an expansion valve labeled with the reference character 5. Said valve is integrated in each case into flow section 12 of the refrigerant and in each case is placed in fluid distribution region 4. Said expansion valve 5 corresponds to a typical expansion valve, as used in refrigerant circuits in other solutions in the prior art. Expansion valve 5 in this case can be placed at a later time into heating/cooling module 1 and can be screwed together with heating/cooling module 1 or simply inserted into it.

Heating/cooling module 1 is produced with a stacked disc design and thus made by stacking a number of individual disc elements one on top of the other. The disc stack is closed at the top and bottom in each case by an end plate. A plurality of flow channels result between the individual disc elements; said channels are in fluid communication with one another via openings in the individual disc elements in such a way that a plurality of flow sections 12, 13, and 14 are formed within heating/cooling module 1. To this end, the individual disc elements can have openings which may have passages, for example, by means of which it is possible to control selectively a fluid flow between the disc elements. Further, turbulence inserts can be provided in the flow channels between the disc elements in order to further influence the flow in the individual flow channels and to increase the heat transfer.

A coolant or a refrigerant can optionally flow through the individual flow channels and the flow occurs here such that the coolant flows with the refrigerant in adjacent sections in countercurrent to one another or cocurrent to one another.

In the exemplary embodiment of FIG. 1, a condenser region 2 is disposed in the left region and an evaporator region 3 in the right region. The two regions 2, 3 are separated by a fluid distribution region 4. This fluid distribution region 4 has fluid inlets and fluid outlets 6 to 11, by means of which the coolant and refrigerant can flow into and out of heating/cooling module 1.

In the exemplary embodiment of FIG. 1, the flow through condenser region 2 occurs simply in a U-shaped form. In other words, no further redirection occurs within condenser region 2. The flow goes through evaporator region 3 likewise in a U-shaped loop without providing further redirections. The refrigerant flows via fluid distribution region 4 and flows in a U-shaped manner through evaporator region 3, situated on the right. Expansion valve 5 is arranged upstream of evaporator region 3 within fluid distribution region 4 and is arranged, furthermore, in the flow direction of the refrigerant downstream of condenser region 2. The refrigerant also flows through condenser region 2 in a U-shaped manner. Then, the refrigerant is taken out of heating/cooling module 1 via third fluid outlet 11.

Heating/cooling modules 1 shown in FIGS. 1, 2, and 4 to 18 each have fluid inlets and fluid outlets 6 to 11, which are provided laterally on heating/cooling module 1. These can be arranged preferably on a common outer surface. In otherwise known solutions in the prior art, the fluid inlets and outlets are generally located on the top or bottom end plate of the disc stack, so that the fluid supply occurs from the top or from the bottom. This is particularly disadvantageous, because the inlet and outlet lines for the heating/cooling module must be introduced on two different outer surfaces of the heating/cooling module. In contrast, FIGS. 1, 2, and 4 to 18 have an advantageous design, because the corresponding inlet and outlet lines need to be introduced only on one outer surface of heating/cooling module 1.

Figure 2:
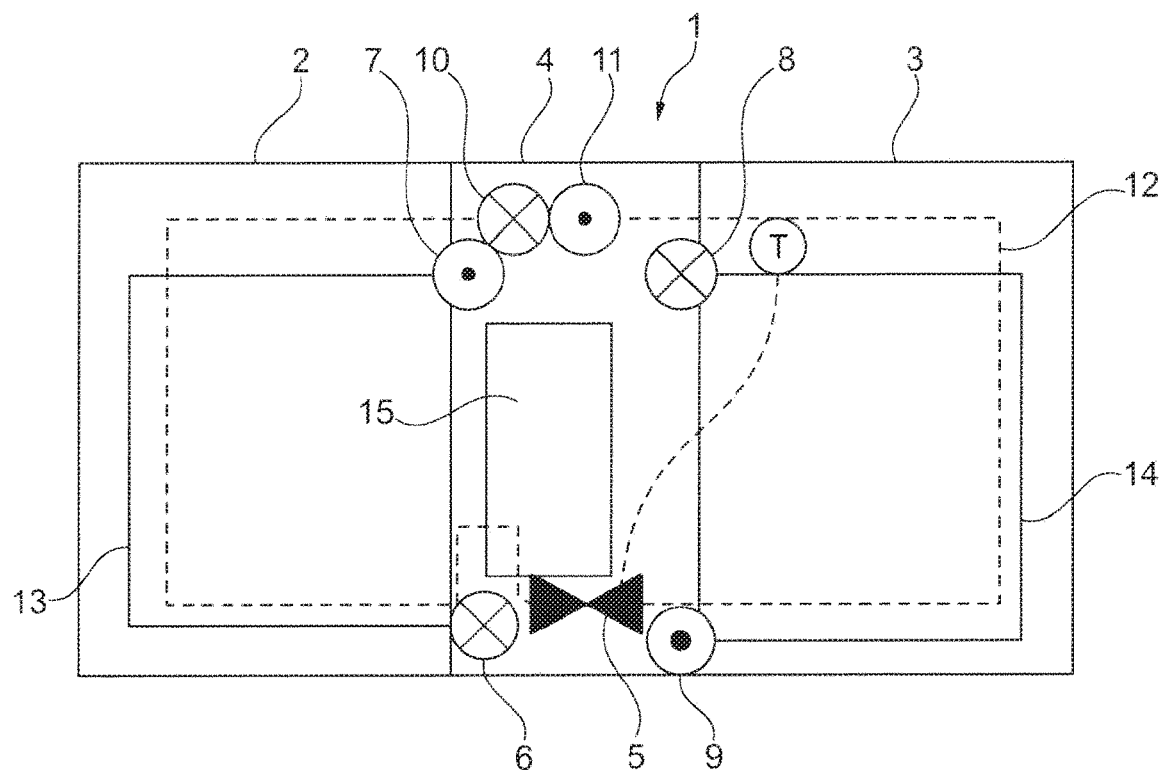

FIG. 2 shows an alternative embodiment of heating/cooling module 1, whereby in addition a so-called collector 15, which is placed in the flow direction upstream of expansion valve 5 and downstream of condenser region 2, is provided in fluid distribution region 4. The rest of the flow through heating/cooling module in FIG. 2 corresponds to the exemplary embodiment of FIG. 1. Collector 15 is used in particular for storing the refrigerant and can thereby bring about volume compensation. Further, dryers and filters for drying and/or filtering the refrigerant can be provided in collector 15.

Figure 3:
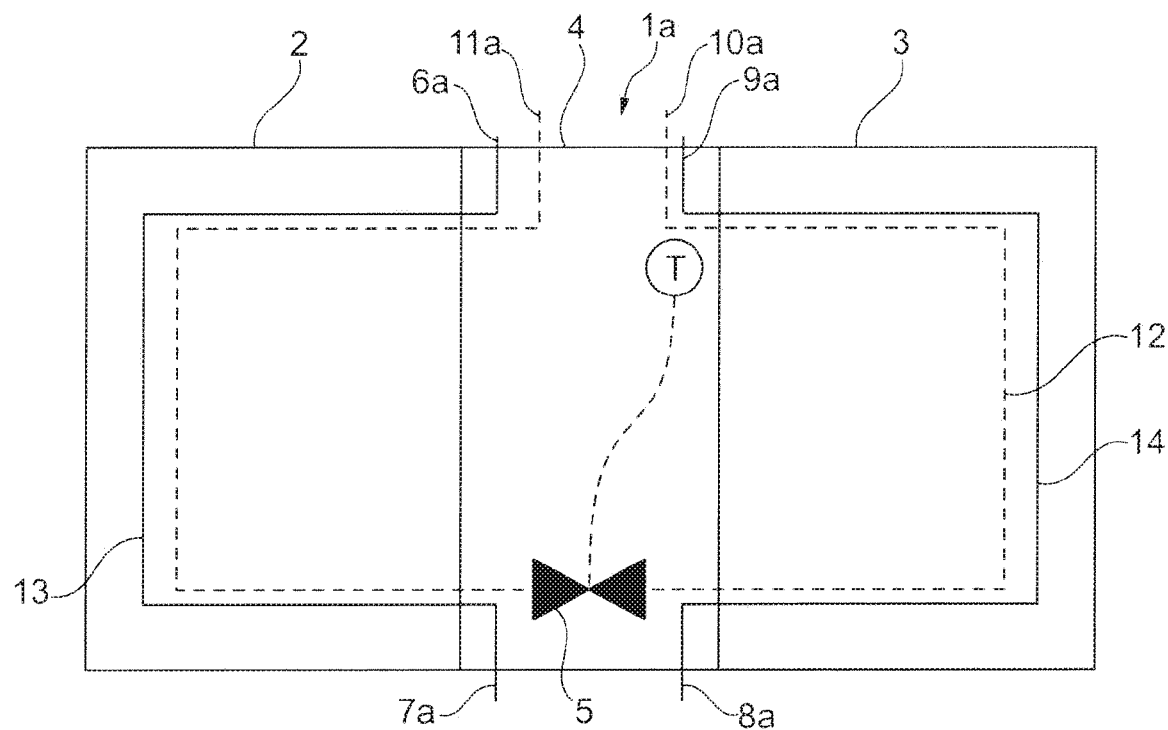

FIG. 3 shows a heating/cooling module 1a with connections at the top or bottom, as are known in the prior art. The rest of the structure of heating/cooling module 1a corresponds to that of heating/cooling module 1 of FIG. 1. Only the arrangement of the connections is known from the prior art. The combination of condenser region 2 and of evaporator region 3 with a fluid distribution region 4 in a mutual structural element corresponds to the subject of the invention, as was already shown in FIG. 1. Fluid inlets and fluid outlets 6a to 11a are located on the top or bottom side of cooling module 1a. Beyond that, there are no differences relative to the exemplary embodiment in FIG. 1.

Figure 4:
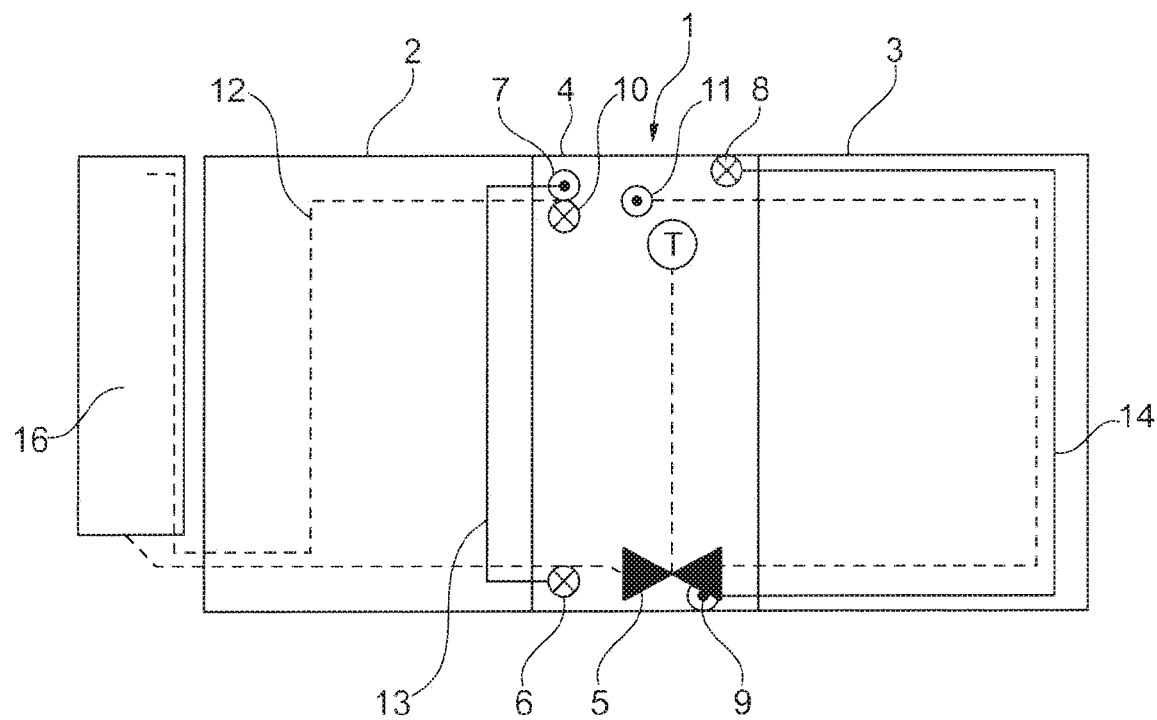

FIG. 4 shows a further alternative exemplary embodiment of a heating/cooling module 1. Here, an external collector 16 is disposed outside heating/cooling module 1. The collector is disposed adjacent to condenser region 2. External collector 16 is placed in the flow direction along flow section 12 upstream of expansion valve 5 and downstream of condenser region 2. Furthermore, a coolant flows in a U-shaped manner through condenser region 2 and likewise a coolant flows through evaporator region 3 in a U-shaped manner.

Figure 5:
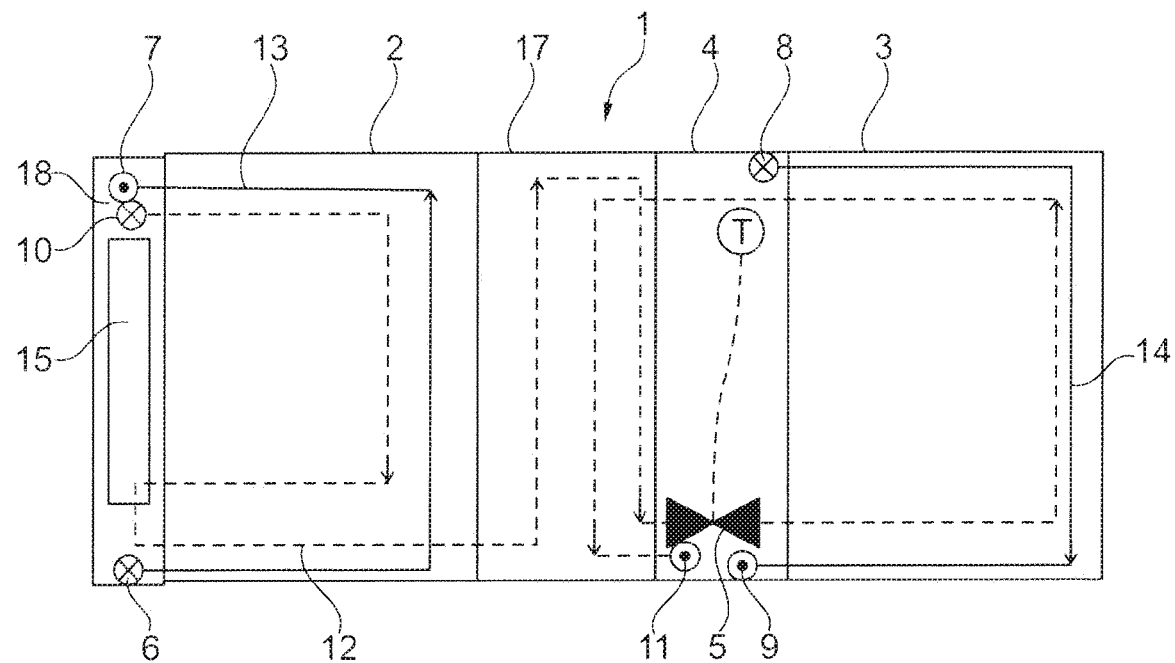

FIG. 5 shows a further alternative embodiment of a heating/cooling module 1 with a condenser region 2 and an evaporator region 3, between which a fluid distribution region 4 is disposed. Further, an internal heat exchanger is realized in a region 17. In particular a heat exchange between the refrigerant flowing out of condenser region 2 and the refrigerant flowing out of evaporator region 3 can be achieved in this internal heat exchanger 17. To this end, the refrigerant is taken in a number of loops and with a number of redirections through region 17, which represents the internal heat exchanger. Further, a second fluid distribution region 18, in which a collector 15 is provided, is provided on the left next to the condenser region. Second fluid distribution region 18 has in particular third inlet 10, first inlet 6, and first outlet 7. Second inlet 8, second outlet 9, and third outlet 11 are each disposed in fluid distribution region 4. Likewise, expansion valve 5 is located in said fluid distribution region 4. The refrigerant flows through condenser region 2 in a U-shaped manner, before it flows into collector 15 placed to the left next to condenser region 2. Finally, the refrigerant after leaving collector 15 is conveyed through condenser region 2 into internal heat exchanger 17. After internal heat exchanger 17, the refrigerant flows through evaporator region 3 in a U-shaped manner, before the refrigerant is finally taken back to internal heat exchanger 17 and from there to third fluid outlet 11, situated at the bottom. The conveying of the refrigerant through condenser region 2 can be achieved, for example, by immersion sleeves, which are run through the structure of heating/cooling module 1.

Figure 6:
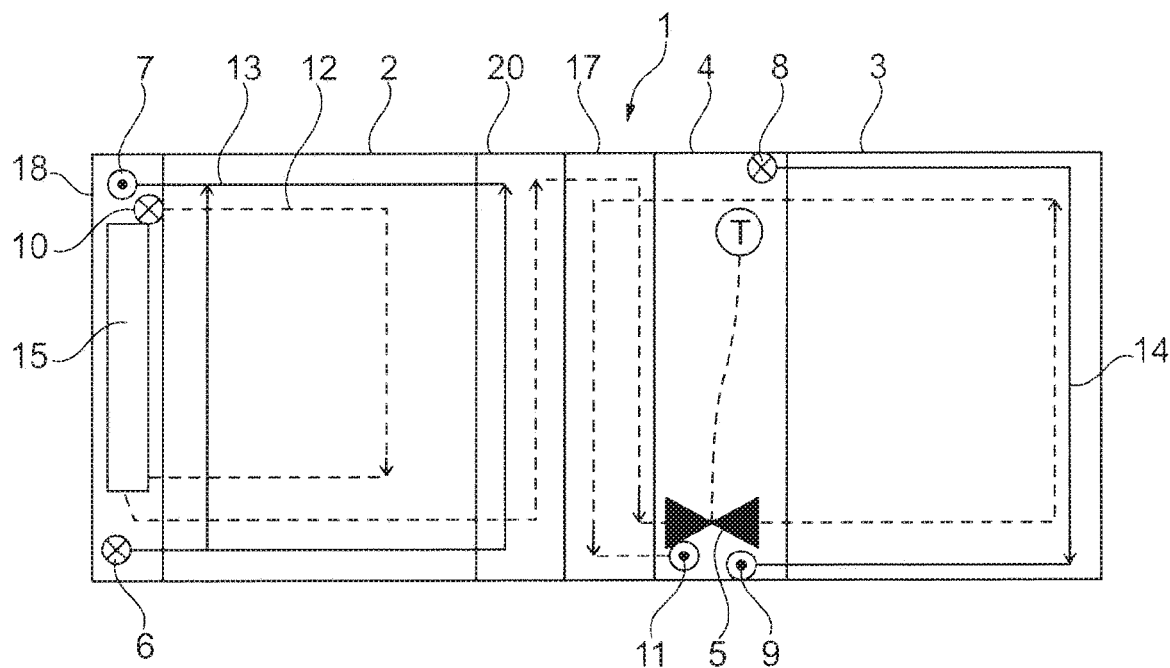

FIG. 6 shows an embodiment of heating/cooling module 1, whereby a subcooling region 20 is disposed between internal heat exchanger 17 and condenser region 2. A second fluid distribution region 18 with a collector 15 is also disposed on the left next to condenser region 2, as already shown in FIG. 5. In addition to internal heat exchanger 17, the refrigerant and the coolant of condenser region 2 now also flow through subcooling region 20. Further cooling of the refrigerant in subcooler 20 is achieved in this way, by means of which the efficiency of heating/cooling module 1 can be increased overall. Fluid distribution region 4, on the right next to internal heat exchanger 17, and evaporator region 3 correspond further to the exemplary embodiment in FIG. 5.

Figure 7:
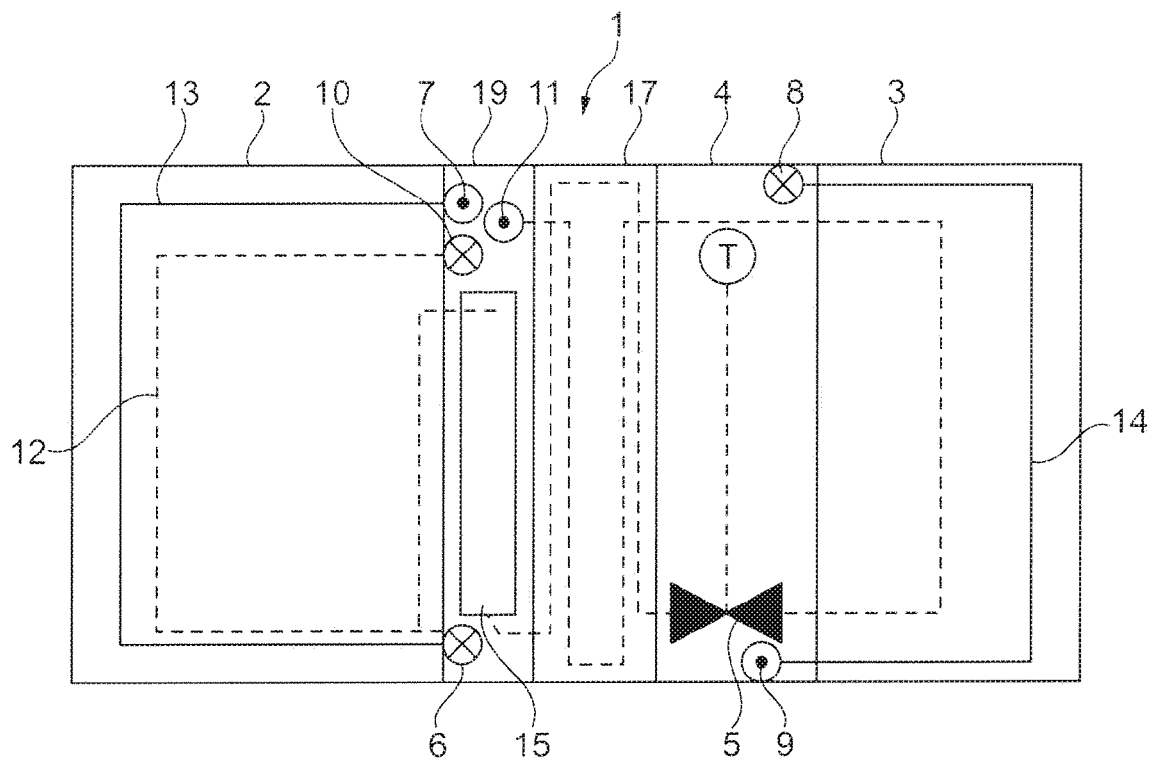

FIG. 7 shows an alternative arrangement of an evaporator region 3 at the right end region with a fluid distribution region 4 arranged next to it, an internal heat exchanger 17 arranged next to that, and a further fluid distribution region 19, which has a collector 15. Condenser region 2 is disposed on the left next to fluid distribution region 19. The refrigerant flows in within fluid distribution region 19 and flows through condenser region 2 in a U-shaped manner, before it is conveyed into collector 15 in fluid distribution region 19. From collector 15, the refrigerant finally flows into internal heat exchanger 17, before it flows through the expansion valve in fluid distribution region 4 and flows into evaporator region 3. The refrigerant flowing out of evaporator region 3 is finally again brought into heat exchange with the refrigerant flowing out of collector 15 in heat exchanger 17. The refrigerant then flows out of heating/cooling module 1 via fluid distribution region 19 in the upper region via third fluid outlet 11. The coolant flows through condenser region 2 and evaporator region 3 in each case in a U-shaped manner without further redirection.

Figure 8:
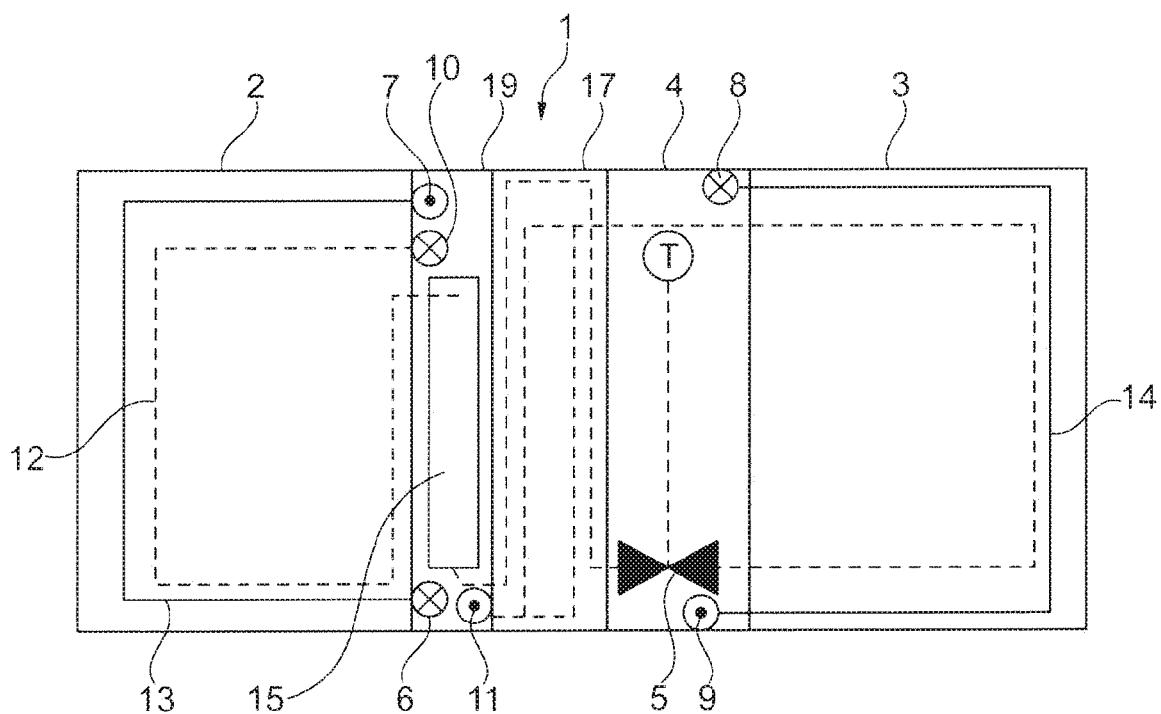

The exemplary embodiment of FIG. 8 corresponds very largely to that in FIG. 7, with the difference that the refrigerant flowing out of evaporator region 3 into internal heat exchanger 17 is conveyed in two parallel flow paths from top to bottom and finally is taken out of heating/cooling module 1 via a third fluid outlet 11, situated at the bottom.

Figure 9:
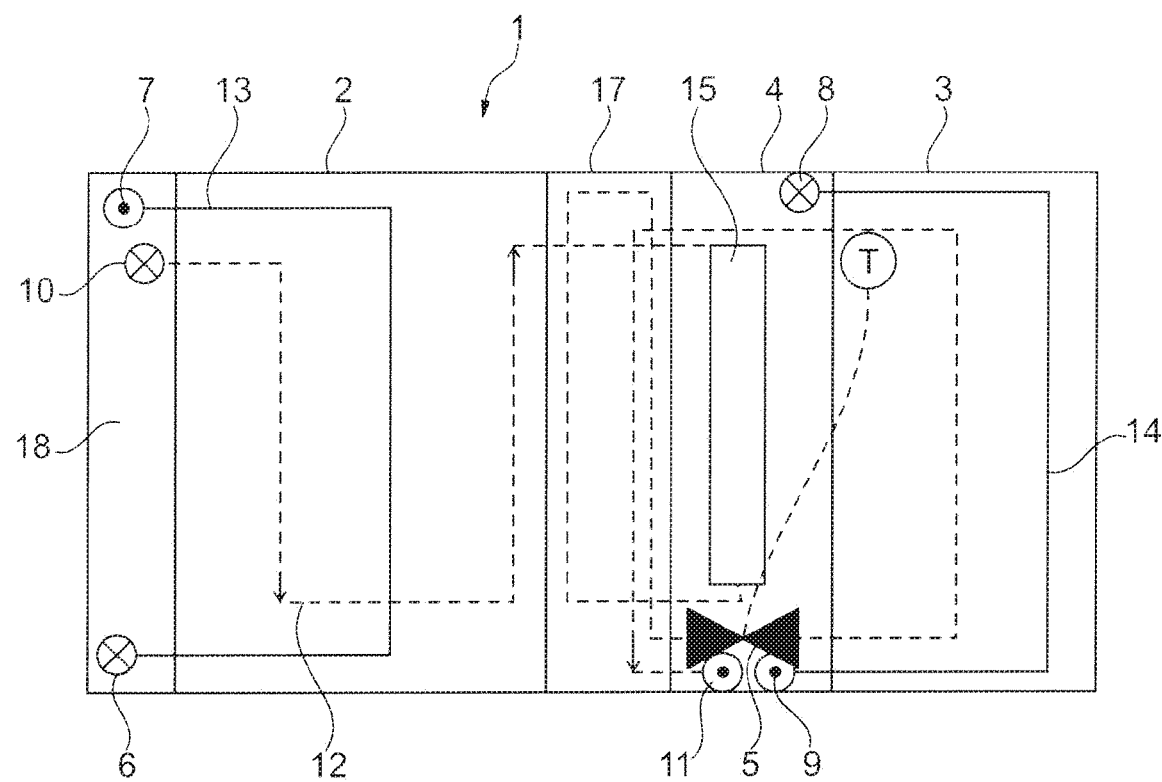

In the exemplary embodiment of FIG. 9, collector 15 is disposed in fluid distribution region 4. The coolant for evaporator region 3 is supplied via second fluid inlet 8 and second fluid outlet 9 via the fluid distribution region 4. An internal heat exchanger 17, in which the refrigerant of condenser region 2 is brought into heat exchange with the refrigerant of evaporator region 3, is disposed on the left next to fluid distribution region 4. A fluid distribution region 18, which has third inlet 10, first inlet 6, and first outlet 7, is disposed on the left next to condenser region 2. Third inlet 10 is located at the upper end region and the refrigerant flows through the condenser region in a U-shaped manner from top down and finally back again upward and passes at the upper region through internal heat exchanger 17 into collector 15, which is disposed in fluid distribution region 4. From there, the refrigerant flows back in the lower region into internal heat exchanger 17, where it is redirected in a loop, and after it has flowed through an upper region of internal heat exchanger 17 is redirected in the lower region back into fluid distribution region 4 and there into expansion valve 5. The refrigerant then flows in a U-shaped manner from the bottom to the top through evaporator region 3 and back into internal heat exchanger 17 and there from top down to third fluid outlet 11, which is disposed in the lower region in fluid distribution region 4.

Figure 10:
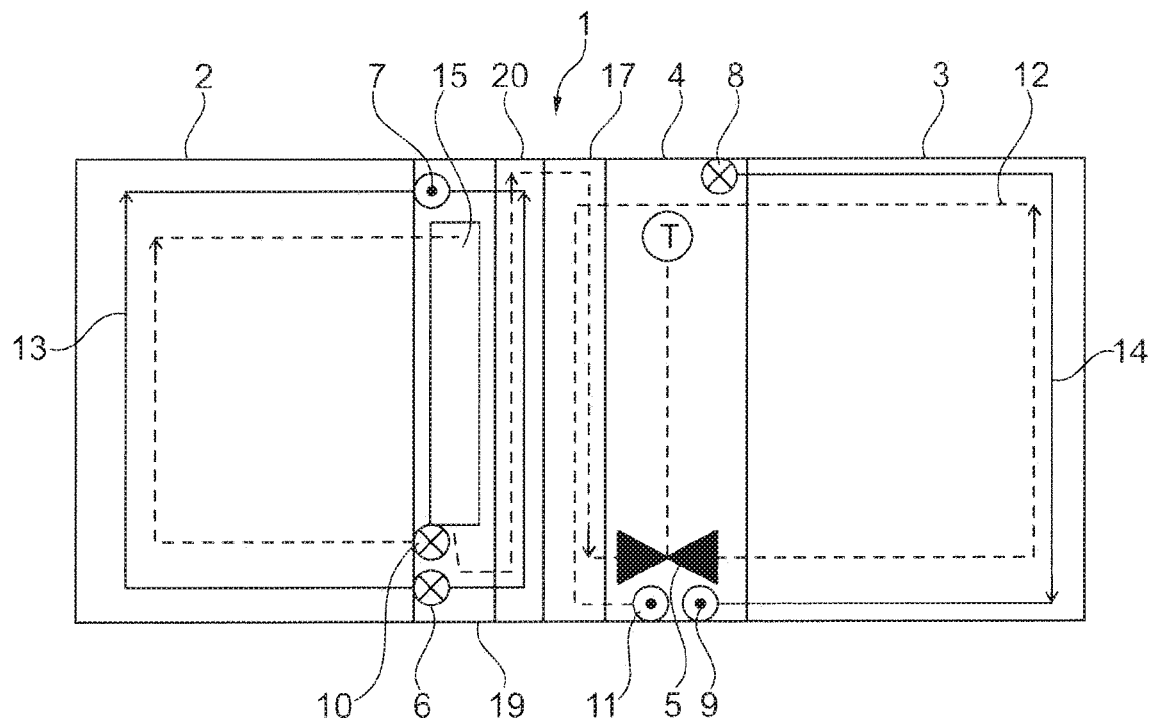

FIG. 10 shows an arrangement, whereby an internal heat exchanger 17, a subcooler 20, and a second fluid distribution region 19 are disposed on the left next to fluid distribution region 4. Further, a collector 15 is disposed in the left fluid distribution region 19. The refrigerant in the example of FIG. 10 flows through the third fluid inlet into second fluid distribution region 19 in the lower region and flows through condenser region 2 in a U-shaped manner, before it enters collector 15 in the upper region. The refrigerant flows out of collector 15 at the lower end of collector 15 and is finally conveyed into subcooler 20 in a cocurrent with the coolant of condenser region 2, before it is transferred in the upper region into internal heat exchanger 17 and after a redirection in the lower region finally flows through fluid distribution region 4 and expansion valve 5 into evaporator region 3. From evaporator region 3, where it flows in a U-shaped manner, it is finally returned through fluid distribution region 4 into internal heat exchanger 17 and is there conveyed from the top down to third fluid discharge 11, situated at the bottom, in fluid distribution region 4. A further heat transfer between the refrigerant and the coolant of condenser region 2 is assured in this way in subcooler region 20 and a heat exchange between the refrigerant from condenser region 2 and evaporator region 3 in internal heat exchanger 17.

The coolant of evaporator region 3 is conveyed further through it in a U-shaped manner. The coolant for condenser region 2 is introduced at a first fluid inlet 6, situated at the bottom, into second fluid distribution region 19 and there conveyed in two directions to the left and to the right both into internal heat exchanger 20 and into condenser region 2. There, it flows in each case upward and finally flows out of heating/cooling module 1 via first fluid outlet 7, situated at the upper end region.

Figure 11:
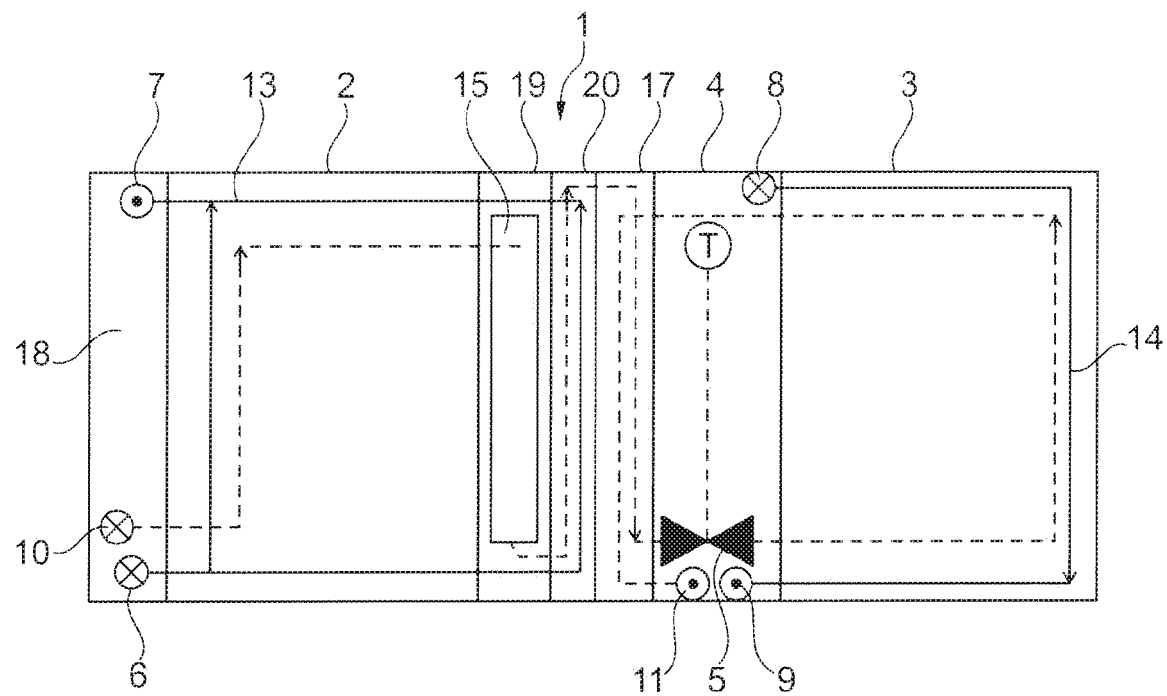

FIG. 11 shows a structure of a heating/cooling module 1, as was already shown in FIG. 10. In addition, a further fluid distribution region 18 is now disposed at the left end region of condenser region 2. This region has first inlet 6, first outlet 7, and third inlet 10. The rest of the inlets and outlets 8, 9, and 11 are located in fluid distribution region 4 on the left next to evaporator region 3. Third fluid inlet 10 is located in the lower region, as a result of which the refrigerant passes in the lower region into condenser region 2 and there flows upward, before it flows in the upper region into the further fluid distribution region 19 and collector 15 disposed therein. The refrigerant leaves at the lower end of collector 15 and is conveyed upward in a cocurrent with the coolant of condenser region 2 within subcooler 20. There it flows to the right via internal heat exchanger 17, where it is again brought into a further heat exchange with the refrigerant, which has already flowed through evaporator region 3. The refrigerant finally flows out via third fluid outlet 11 at the lower end region of heating/cooling module 1. A modified fluid routing within condenser region 2 can be realized by the arrangement of third inlet 10 in the left fluid distribution region 18. The coolant of condenser region 2 is also supplied via fluid distribution region 18, situated on the left, into the lower region and there flows upward both in condenser region 2 and also upward in subcooler region 20. The coolant finally flows out of heating/cooling module 1 via a common flow section through first fluid outlet 7.

Figure 12:
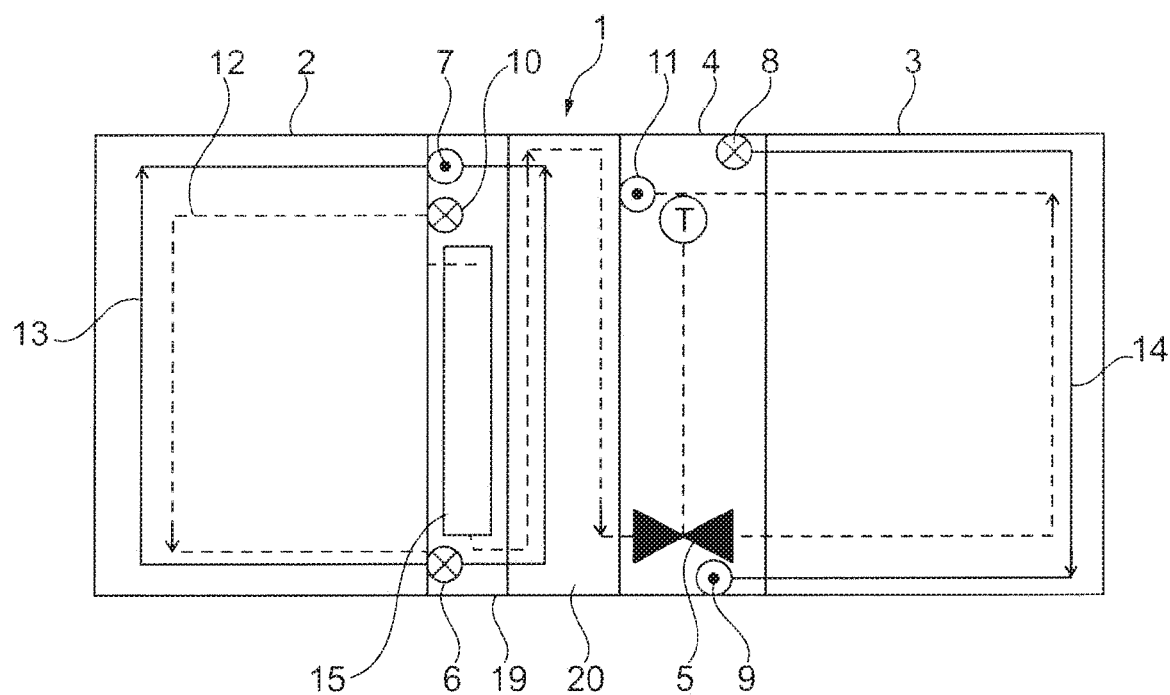

An arrangement is shown in FIG. 12, which has from the left a condenser region 2, an adjacent fluid distribution region 19, an adjacent subcooler 20, a further fluid distribution region 4, and an evaporator region 3. Further, a collector 15, through which the refrigerant flows from the top down, is disposed in left fluid distribution region 19. The refrigerant flowing out of collector 15, further, is brought into heat exchange with the coolant of condenser region 2 in subcooler region 20. To this end, the refrigerant flows at the upper end through third inlet 10 into fluid distribution region 19 in heating/cooling module 1 and is here taken in a loop through condenser region 2, so that it can enter at the upper region of collector 15. The refrigerant is finally conveyed also in a U-shaped manner through evaporator region 3 and leaves heating/cooling module 1 at a third fluid outlet 11 situated at the top.

Figure 13:
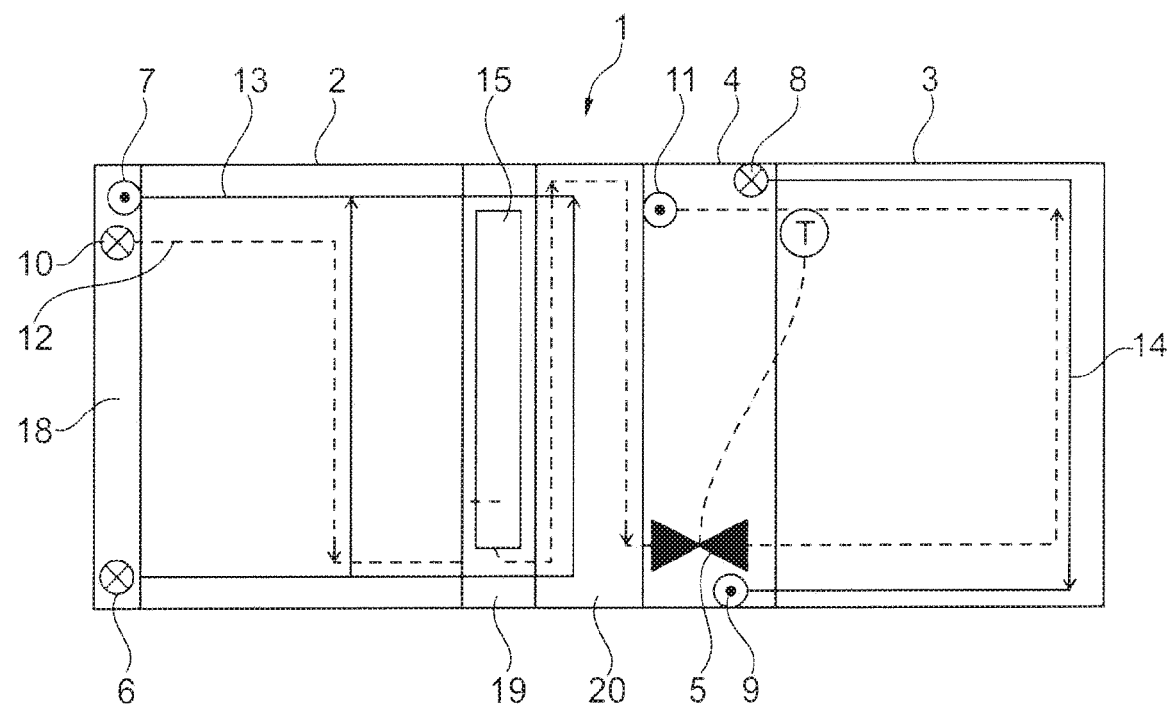

FIG. 13 shows an arrangement according to FIG. 12 with the difference that a further fluid distribution region 18 is disposed at the left end region of condenser region 2. Said region has third fluid inlet 10, first fluid inlet 6, and first fluid outlet 7. Similar to FIG. 11, this additional fluid distribution region 18 makes possible a modified fluid routing, in particular for the refrigerant along flow section 12 within heating/cooling module 1. The refrigerant in condenser region 2 is not conveyed in a loop, but enters at the upper region of heating/cooling module 1 and flows within condenser region 2 from the top down and from there into collector 15. Because a subcooler region 20 is provided in FIG. 13 as well, the coolant of condenser region 2 is conveyed from the bottom upward both within condenser region 2 and in subcooler region 20. Both fluid streams are then taken by a common flow path out of first fluid outlet 7 out of heating/cooling module 1.

Figure 14:
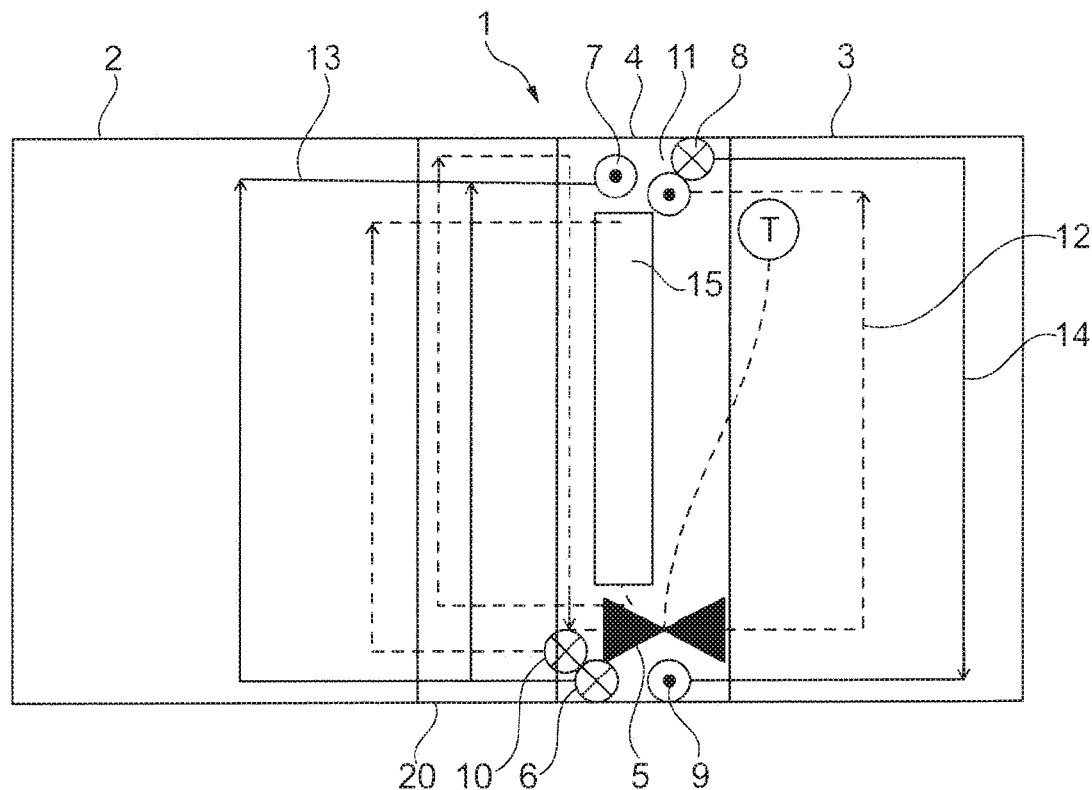
Figure 15:
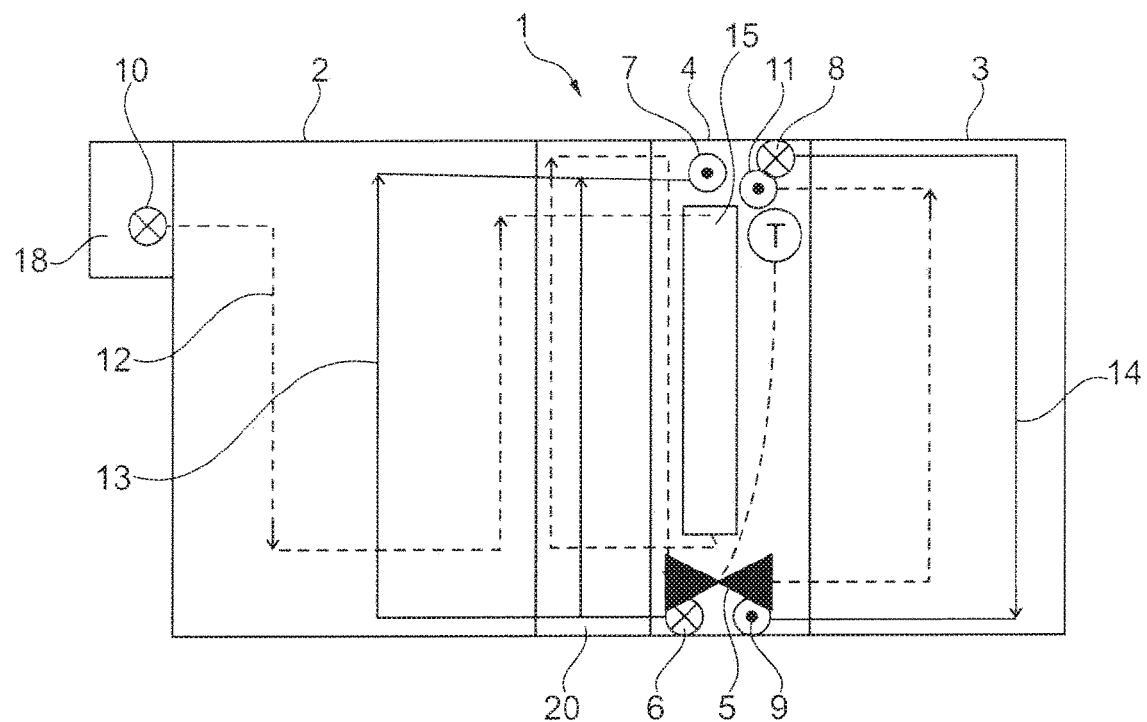
Figure 16:
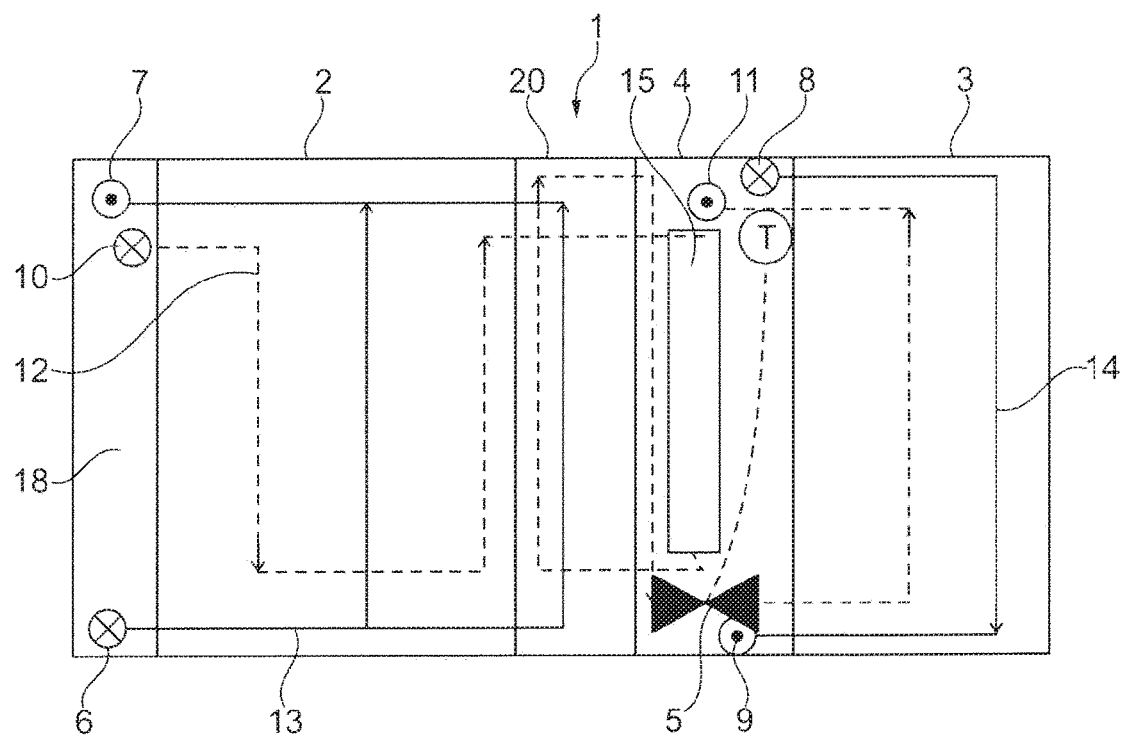

The following FIGS. 14, 15, and 16 each have a condenser region 2 situated on the left, which is followed to the right by a subcooler region 20 and further to the right by a fluid distribution region 4, which has a collector 15. An evaporator region 3 is located beside this on the right. Fluid inlets and outlets 8 to 11 in the example of FIG. 14 are located completely within fluid distribution region 4. A heat exchange between the refrigerant and the coolant of condenser region 2 is realized within subcooler 20. The refrigerant flows in particularly at the lower end region of fluid distribution region 4 and there flows through subcooler 20 into condenser region 2; from there the refrigerant flows in the upper region back into fluid distribution region 4 and into collector 15. From the lower end region of collector 15, the refrigerant passes through expansion valve 5 in the lower region of heating/cooling module 1 into evaporator region 3, where it flows upward and finally flows out of heating/cooling module 1 at a third fluid outlet 11, situated above. The coolant both for condenser region 2 and for evaporator region 3 is taken in each case in a simple U-shaped form along flow sections 13 or 14 through heating/cooling module 1.

FIG. 15 shows a structure similar to FIG. 14, whereby in addition at the left end region a fluid distribution region 18, extending at least over a subregion of the height of heating/cooling module 1, is provided. Third fluid inlet 10 in particular is provided in said distribution region. The further fluid inlets and outlets 6 to 9 and 11 are located in the fluid distribution region 4, situated on the right. A different routing of the refrigerant within heating/cooling module 1 results because of third inlet 10 in fluid distribution region 18. The refrigerant flows in the upper region into condenser region 2 and there downward and in a U-shaped manner upward again, before it flows through subcooler region 20 into the upper region of collector 15. From there, the refrigerant flows through the lower region of heating/cooling module 1 back into subcooler region 20 and there enters into a heat exchange with the coolant of condenser region 2. Finally, the refrigerant flows upward and in the upper region to the right into fluid distribution region 4, where it flows downward and flows through expansion valve 5 into evaporator region 3. There it flows back at the upper end region of heating/cooling module 1 and finally out of heating/cooling module 1 via third fluid outlet 11 in fluid distribution region 4.

FIG. 16 shows a similar structure, whereby to the left of condenser region 2 a fluid distribution region 18 is now disposed over the full height of heating/cooling module 1. First fluid inlet 6, third fluid inlet 10, and first fluid outlet 7 in particular are located in fluid distribution region 18. The flow through heating/cooling module 1 occurs largely similar to the exemplary embodiment shown in FIG. 15. Only the routing of the coolant through condenser region 2 along flow section 13 is different in that the coolant flows only in a U-shaped manner out of fluid distribution region 18, situated on the left, through the lower region of heating/cooling module 1 into condenser region 2 and into subcooler region 20 and there flows upward and flows with a common fluid routing out of first fluid outlet 7 in the upper region.

Figure 17:
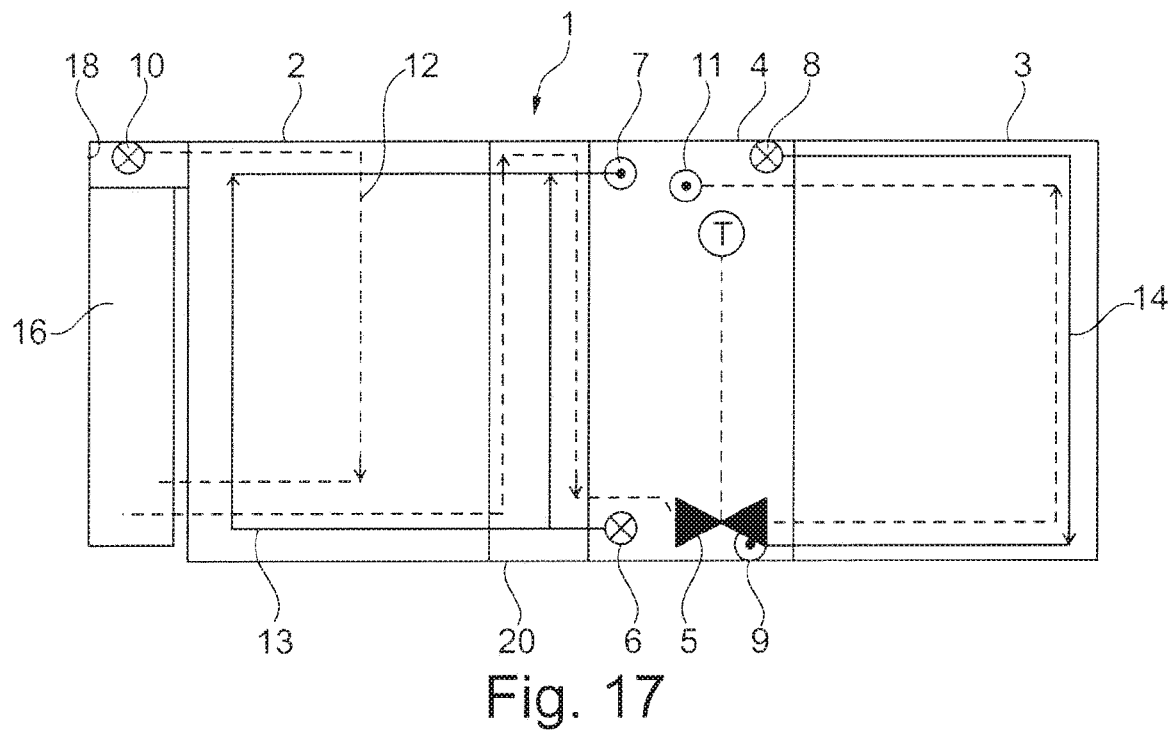

FIG. 17 shows an embodiment, whereby an external collector 16 is provided on the left next to condenser region 2 and further a fluid distribution region 18, which extends at least over a subregion in terms of height and is located at the upper end of heating/cooling module 1.

In FIG. 17, the refrigerant flows through third fluid inflow 10, situated above, in fluid distribution region 18, situated on the left, into heating/cooling module 1 and there passes in the upper region into condenser region 2. There the refrigerant flows downward and to the left into external collector 16. There the refrigerant flows through collector 16 and finally flows at the lower end region of collector 16 through condenser region 2 into subcooler region 20, where it flows upward and is redirected in a U-shaped manner and finally flows downward again and there enters into heat exchange with the coolant of condenser region 2. The refrigerant is passed at the lower end region into fluid distribution region 4, situated on the right, before it flows through expansion valve 5 into evaporator region 3 and there flows upward in a U-shaped manner and finally to the left back into fluid distribution region 4. The refrigerant then flows out via third fluid outlet 11 at the upper end of heating/cooling module 1. The coolant for condenser region 2 flows into fluid distribution region 4, situated on the right, in the lower region and is there distributed in subcooler region 20 and condenser region 2, where it flows upward and flows via a common flow section to the right back into fluid distribution region 4, where is flows out at the upper first fluid outlet 7.

Figure 18:
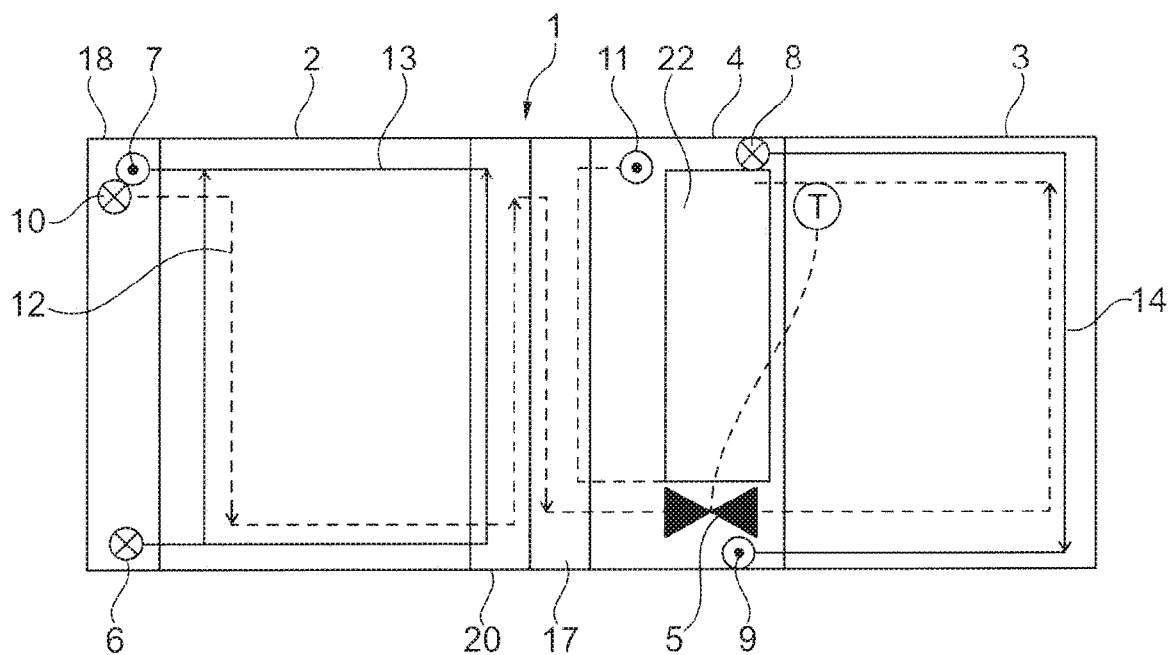

FIG. 18 shows a further exemplary embodiment, whereby a fluid distribution region 18 is located on the left, which has first fluid inlet 6, first fluid outlet 7, and third fluid inlet 10; a condenser region 2 is disposed next to it to the right, a subcooler region 20 next to that to the right, an internal heat exchanger 17 next to that to the right, a fluid distribution region 4 next to that to the right, and finally an evaporator region 3 next to that to the right. The refrigerant is flowed in the upper region of fluid distribution section 18, situated on the left, into heating/cooling module 1 and finally passes to the right into condenser region 2, where it flows downward and passes in the lower end region into subcooler section 20. There, the refrigerant is redirected upward and enters into heat exchange with the coolant of condenser region 2. In the upper region, the refrigerant is passed into internal heat exchanger 17, situated on the right, where it flows downward and finally to the right through fluid distribution region 4 and expansion valve 5, situated therein, into evaporator region 3, situated on the right. There, it is taken upward in a U-shaped manner and finally in the upper region back to the left, where it flows into collector 22 within fluid distribution region 4. The refrigerant finally flows out at the lower end region of collector 22 and back into internal heat exchanger 17, where it finally flows upward and to the right back into fluid distribution region 4 and flows out of third fluid outlet 11 in the upper region of heating/cooling module 1.

The coolant of condenser region 2 flows in in the lower region of left fluid distribution region 18 and flows in two flow paths, running parallel to one another, upward both in subcooler region 20 and also in condenser region 2 and is there taken via a common flow path to first fluid outlet 7, situation above.

Collector 22 shown in FIG. 18 is a low-pressure collector through which a low-pressure refrigerant flows. For this purpose, in particular a pressure-reducing element can be provided, which can be represented, for example, by a cross-sectional narrowing of the flow path.

FIGS. 1 to 18 each show only a schematic flow through heating/cooling module 1 or 1a. In particular, a number of redirections can be provided, which lead to an improved circulation of the refrigerant or coolant within heating/cooling module 1 or 1a. The flow directions of the coolant or refrigerant can also be reversed in alternative embodiments, so that regions, flowing in a cocurrent to one another, can thereby be flowed through in a countercurrent to one another, as a result of which the heat transfer can be improved.

FIGS. 1 to 18 show in particular only a schematic illustration, by means of which, however, the range of solutions with respect to material selection, dimensions, and the arrangement of the elements relative to one another is not limited. In particular the different possibilities of the sequential arrangement of the individual regions, such as the fluid distribution regions, the condenser region, the internal heat exchanger, the subcooler region, the collector, and the evaporator region, are not limited by the embodiments in FIGS. 1 to 18. FIGS. 1 to 18 show only a non-exhaustive selection of the possible arrangements.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A heating/cooling module comprising:
   a condenser region having a first flow section through which a refrigerant is adapted to flow and a second flow section through which a first coolant is adapted to flow;
   an evaporator region having a third flow section through which the refrigerant is adapted to flow and a fourth flow section through which a second coolant is adapted to flow, wherein the first, second, third and fourth flow sections are formed by a plurality of flow channels;
   at least one fluid distribution region arranged between the condenser region and the evaporator region, the at least one fluid distribution region having a thermostatic expansion valve through which the refrigerant is adapted to flow;
   a first fluid inlet and a first fluid outlet via which the first coolant flows through the condenser region;
   a second inlet and a second outlet via which the second coolant flows through the evaporator region; and
   a third inlet and a third outlet via which the refrigerant flows through the heating/cooling module,
   wherein the first fluid inlet, the first fluid outlet, the second inlet, the second outlet, the third inlet and the third outlet are all located in the at least one fluid distribution region, and
   wherein, in a flow direction of the refrigerant, the condenser region is arranged downstream of the third inlet, the thermostatic expansion valve is arranged downstream of the condenser region and the evaporator region is arranged downstream of the thermostatic expansion valve, such that after the refrigerant enters the third inlet located in the at least one fluid distribution region, the refrigerant flows directly from the third inlet into the condenser region, then flows through the thermostatic expansion valve and then flows through the evaporator region, wherein once the refrigerant exits the evaporator region, the refrigerant flows directly from the evaporator region to the third outlet located in the at least one fluid distribution region.

2. The heating/cooling module according to claim 1, wherein a second fluid distribution region is provided, which is disposed on a side, facing away from the first fluid distribution region of the evaporator region or the condenser region.

3. The heating/cooling module according to claim 1, wherein all inlets and outlets are disposed on a common outer surface of the heating/cooling module.

4. The heating/cooling module according to claim 1, wherein the heating/cooling module further comprises a collector or an internal heat exchanger or a subcooler.

5. The heating/cooling module according to claim 1, wherein a filter is integrated into one of the refrigerant flow sections, and wherein the filter is mounted in a flow direction upstream of the thermostatic expansion valve.

6. The heating/cooling module according to claim 1, wherein a collector is disposed outside the heating/cooling module on or adjacent to one of outer surfaces, and wherein the collector is in fluid communication with one of the refrigerant flow sections.

7. The heating/cooling module according to claim 1, wherein a pressure-reducing section in the form of a cross-sectional narrowing is provided along one of the refrigerant flow sections or one of the coolant flow sections.

8. The heating/cooling module according to claim 1, wherein the first coolant and the refrigerant are adapted to be flowed concurrent or countercurrent to one another through the condenser region and the second coolant and the refrigerant are adapted to be flowed concurrent or countercurrent to one another through the evaporator region.

9. The heating/cooling module according to claim 1, wherein each of the first flow section, the second flow section, the third flow section and the fourth flow section are U-shaped.

\* \* \* \* \*